United States Patent Office 3,030,507
Patented Apr. 17, 1962

3,030,507
X-RAY APPARATUS FOR DETERMINATION OF INTERNAL STRESSES IN MATERIALS
Frantisek Khol, 834 Safarikova, Lysa upon Labe, Czechoslovakia
Filed Jan. 26, 1959, Ser. No. 788,900
Claims priority, application Czechoslovakia Jan. 25, 1958
6 Claims. (Cl. 250—51.5)

This invention relates to apparatus for measuring internal stresses in structural materials, and more particularly to X-ray diffraction apparatus for routine determination of internal stresses.

The methods developed so far for measuring the internal stresses in structural elements, castings and other products include extensometric, photo-elastic and X-ray diffraction methods. The extensometric methods merely permit the determination of stresses on the surface of the object under test. If residual stresses after technological treatment are to be determined, it is indispensable to cut the specimen. The photo-elastic method works only on models made of transparent materials whereon the distribution of stresses can be determined throughout the cross sectional area. X-ray diffraction methods permit both applied and residual stresses to be measured without destruction of the test specimen, but likewise only on the surface. The latter methods are based on the displacement of X-ray interference lines occurring on the lattice planes of the specimen and for this reason, these methods can only be applied to materials having a well developed and suitably arranged atom lattice, i.e., materials yielding measurable interferences for angles of incidence approaching the value of 90°.

Stress measurements by X-ray diffraction are very accurate and enable the determination of internal stresses concentrated in very small areas of the specimen. However, the measurement of stress by the conventional X-ray methods is difficult and time-consuming and it is therefore not widely used in industrial practice. Use of these methods is still largely confined to research laboratories.

The principal object of the present invention is the provision of an improved apparatus for rapid and precise determination of internal stresses in materials. Another object is the provision of apparatus suitable for carrying out stress measurements on large objects in industrial plants and on finished structures. A further object is to carry out measurements without any destruction of the test object and to obtain a degree of precision satisfactory for the requirements of technical practice. The exact nature of the invention as well as other objects and advantages thereof will be readily apparent from consideration of the following specification relating to the annexed drawing in which:

Figure 1:
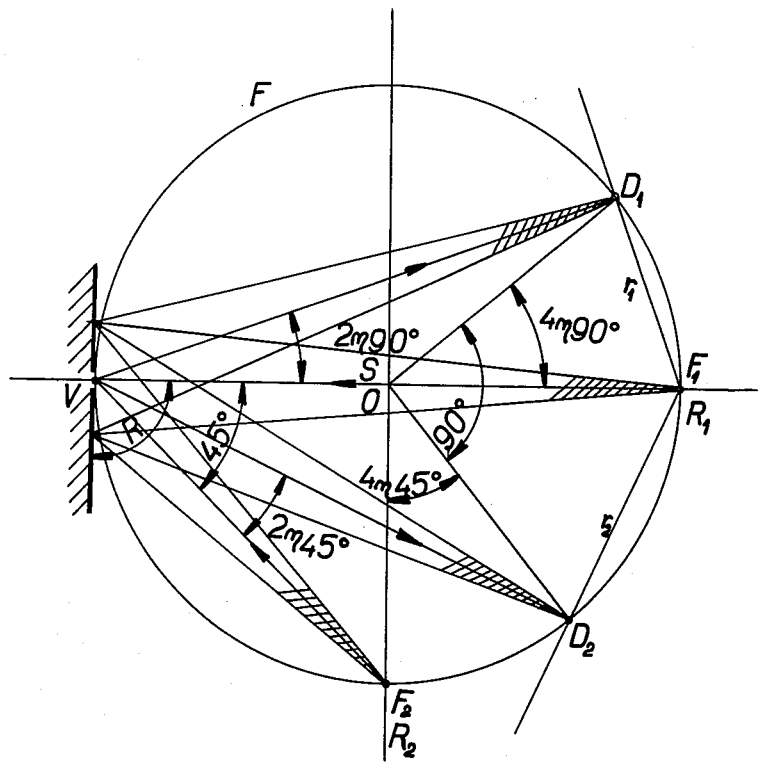
FIG. 1 is a schematic representation of the geometrical relationship defining the location of the structural elements of the invention.

According to an essential feature of the present invention, the surface portion of the test object in which an internal stress is to be determined, is simultaneously exposed to two beams of X-rays under different angles. The beams are produced by two X-ray tubes whose foci are located on a joint focusing circle to which the tested surface is tangential. The position of the interference lines is recorded by means of two detectors placed on the same focusing circle. The relative positions of the X-ray tubes, the detectors and the test object are schematically illustrated in FIGURE 1 of the accompanying drawings.

This arrangement enables two measurements to be performed simultaneously whereas until now they had to be carried out successively. The two X-ray tubes respectively provide a primary beam for normal incidence and a primary beam for inclined incidence under an angle of $\psi_0 = 45°$. If the difference of the angular positions of the interference lines $\Delta$ is determined in both directions by detectors displaced relative to each other along the focusing circle by 90°, the internal stress is calculated from the formula:

$$\sigma = \frac{E}{1+\nu} \cdot \frac{\tan \eta}{\sin^2 (\psi - \eta)} \cdot \text{arc } \Delta \eta \eta \, kg./mm.^2$$

wherein E and $\nu$ are the moduli of elasticity of the material tested,

7$\lambda$ is the wavelength of the X-ray radiation applied
8$\alpha$ is the lattice distance of the atom planes whereon interference occurred.

The high degree of precision required in the determination of the position of the interference maxima is achieved by appropriate selection of the radius of the focusing circle F and of the width of the inlet slit on the detector.

Figure 2:
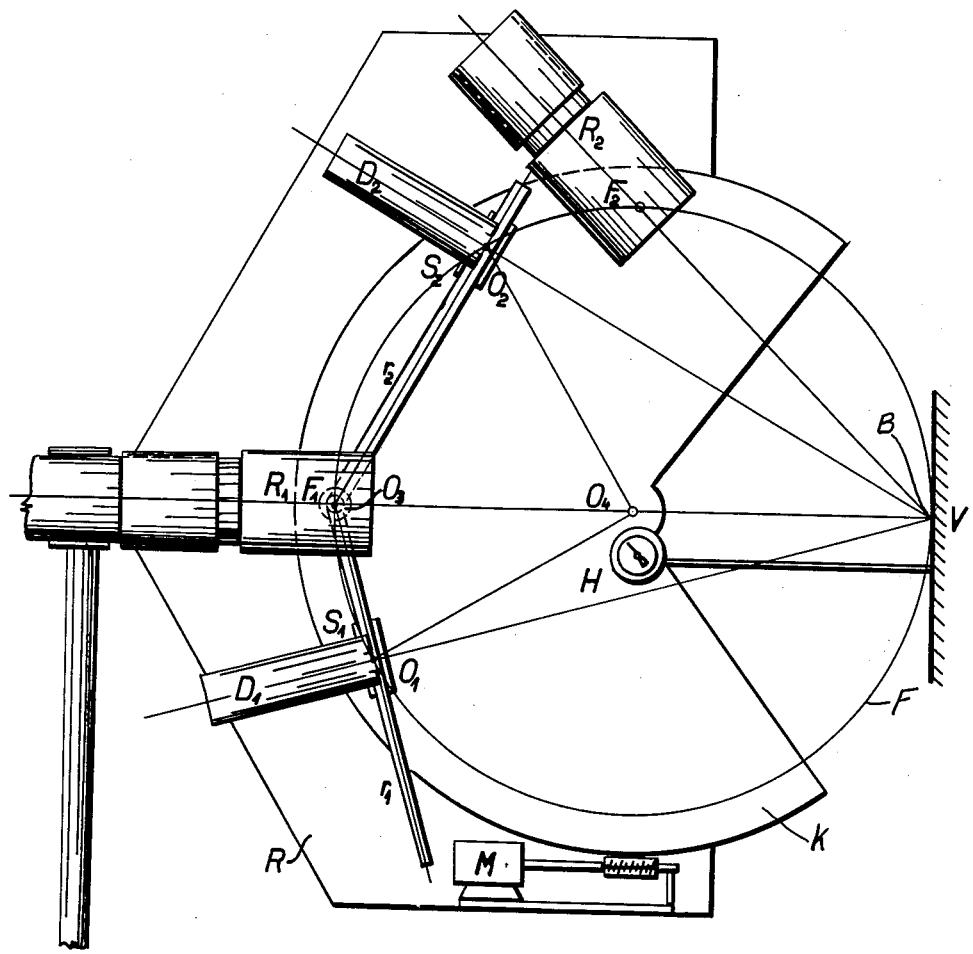
FIG. 2 is a plan view of a preferred embodiment of the invention.
Figure 3:
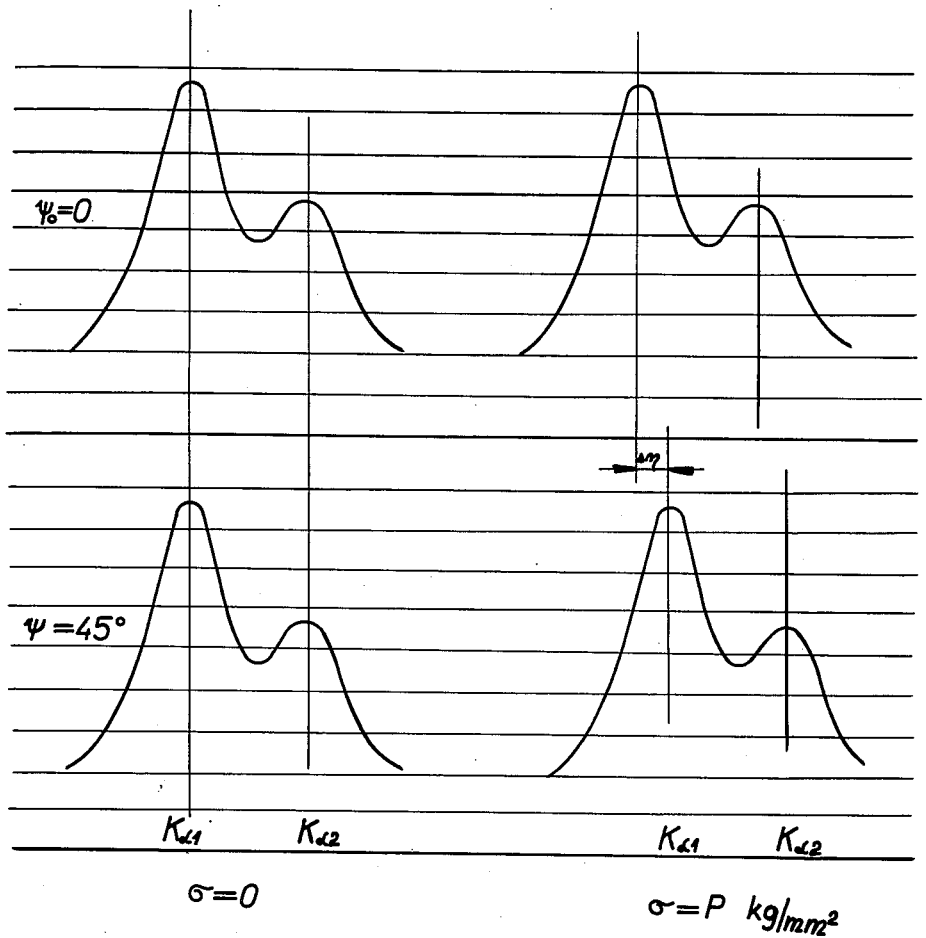
FIG. 3 shows a graphic record produced with the apparatus of FIG. 2.

FIG. 2 of the accompanying drawing illustrates, merely by way of example, the measuring head of an X-ray apparatus which is an embodiment of the present invention. The frame R of the apparatus carries a flat disc K in the shape of a circular sector which is turnable about its center $O_4$ which is also the center of the focusing circle F. Two pivotal pins $O_1$ and $O_2$ mounted on the disc K carry two radiation detectors $D_1$ and $D_2$ the slits $S_1$ and $S_2$ of which are angularly displaced along the circle F by an arc of 90°. The arms $r_1$ and $r_2$ orient the detectors in the manner disclosed in my Patent 2,898,470 so as to make their axes intersect at point B of the focusing circle. The arms are turnable about a stationary pivot $O_3$ and are slidably connected with the detectors at right angles to the respective detector axes. The roentgen tubes $R_1$ and $R_2$ are axially inclined relative to each other and are mounted on the frame R of the measuring head in such a way that their foci are located on the joint focusing circle and their beams enclose an angle $\psi_0 = 45°$. The measuring head is provided with a dial indicator H for adjusting the position of the apparatus until the area of the specimen V which is to be tested is located precisely on the focusing circle. The disc K is rotated by means of a motor M which is synchronized with recording apparatus for registering the intensity of interference sensed by the detectors $D_1$ and $D_2$. The difference of angular position of the maxima of interference (FIGURE 3) on the system of lattice planes inclined against each other by the angle $\psi_0$ is a function of the internal stress which is to be measured and which can be calculated from the above stated formula (1).

The measuring head described above permits the internal stress at a given point to be determined within 15 minutes with satisfactory precision even at places of difficult access and without the destruction of the test piece.

If the angular distribution of the chief components of stress in the surface tested is to be established, it is necessary to turn the measuring head about an axis which is perpendicular to the surface of the test piece, preferably by 45° and 90°, and to take additional interference measurements.

The apparatus according to the present invention also permits the spatial distribution of the internal stresses to be established if each X-ray tube is equipped with an alloys anode which emits X-rays of several discrete wavelengths and permits the internal stress gradient to be determined in a direction perpendicular to the surface.

For the measurement of the internal stresses in objects made of different materials (steel, copper, aluminium, ceramic materials etc.) it is necessary to use X-rays of different wavelengths and to revolve the measuring disc with the detectors into the position of the interference lines.

The apparatus of the present invention is capable not only of measuring internal micro-stresses but also internal macro-stresses which are evaluated from the record produced by the registering apparatus by the formula:

$$\sigma = \pm \beta \frac{E}{4} \cot \theta$$

wherein $\beta$ is the widening of the interference line at half height.

What is claimed is:

1. X-ray diffraction apparatus for measuring internal stresses in material, said apparatus comprising, in combination, a support; X-ray radiating means mounted on said support, said means being arranged to simultaneously provide two sources of X-ray beams; a carrier rotatably mounted on said support for rotation about an axis, said beams being focused on a focusing circle centered in said axis, and aligned for intersection of the respective axes of said beams at a predetermined angle in a point of said circle; and two radiation detecting means mounted on said carrier on said focusing circle, each aimed at said point of intersection of said X-ray beams, said radiation detecting means being displaced relative to each other on said focusing circle by an arc corresponding to a central angle equal to twice said predetermined angle.

2. X-ray diffraction apparatus for measuring stresses in material comprising, in combination, a support; a carrier rotatable on said support about an axis; two sources of respective X-ray beams mounted on said support at equal distance from said axis and defining a focussing circle about said axis, said beams having respective axes aligned for intersecting in a point of said circle for reflection from a specimen surface tangential to said circle at said point, the reflected beams being focussed in respective foci on said circle; and two radiation detection means respectively mounted on said carrier on said circle for scanning the intensity of said reflected beams when said carrier rotates about said axis.

3. Apparatus as set forth in claim 2, wherein the axes of said beams intersect at a predetermined angle, and said radiation detection means are displaced from each other along said circle by an arc corresponding to a central angle equal to twice said predetermined angle.

4. Apparatus as set forth in claim 2, wherein the axis of one of said beams passes through said axis of rotation of said carrier.

5. Apparatus as set forth in claim 2, further comprising means for continuously aiming said radiation detection means on said point.

6. Apparatus as set forth in claim 2, wherein one of said sources is located on said circle diametrically opposite said point and the other one of said sources is angularly displaced from said one source by an arc of 90° of said circle.

References Cited in the file of this patent

UNITED STATES PATENTS

| | | |
|---|---|---|
| 2,207,867 | Loebell | July 16, 1940 |
| 2,462,374 | Firth | Feb. 22, 1949 |

OTHER REFERENCES

Cullity: Elements of X-Ray Diffraction, 1st Edition, 1956, pp. 441–447, sections 17–5 and 17–6.

Shahbender: X-Ray Spectrograph, RCA Technical Note No. 204, Princeton, New Jersey, Jan. 5, 1959.